(12) United States Patent
Jones

(10) Patent No.: US 6,343,222 B1
(45) Date of Patent: Jan. 29, 2002

(54) DUAL MODE POWER CONTROLLERS AND RELATED METHOD AND RADIOTELEPHONES

(75) Inventor: Theron Jones, Apex, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/291,773

(22) Filed: Apr. 14, 1999

(51) Int. Cl.[7] .................................................. H04B 1/38
(52) U.S. Cl. ...................................................... 455/574
(58) Field of Search .................................. 455/572, 573, 455/574, 127, 343; 323/222; 307/10.7

(56) References Cited

U.S. PATENT DOCUMENTS 5,790,961 A * 8/1998 Ingram et al. ............... 455/574
5,821,738 A 10/1998 Tsuchiyama et al. ........ 323/222

OTHER PUBLICATIONS

Stengel, B.; "Efficiency Improvement for Battery Saver Sleep Mode"; Motorola Inc. vol. 14, (Dec. 14, 1991) p. 88.
The ARRL Handbook for the Radio Amateur, *ARRl Handbook*, 66th Ed., American Radio Relay League, pp. 6–21–6–23 (Newington, CT 1989).

SMP Controller for High Performance Process Power Supplies, *Vishay Siliconix Si9140*, Rev. F, pp. 1–16 (Jan. 25, 1999).

* cited by examiner

*Primary Examiner*—Thanh Cong Le
(74) *Attorney, Agent, or Firm*—Myers Bigel Sibley & Sajovec

(57) ABSTRACT

A power controller regulates power from a power source coupled to a power source input to a load coupled to a load output, and this power controller includes a switch and a switching controller. The switch is coupled between the power source input and the load output wherein the switch is switched on and off responsive to an input signal. The switching controller is coupled to the switch wherein the switching controller generates the input signal so that the switch is switched on and off to provide a regulated power output to the load output during active load operations and so that the switch couples the power source to the load output without switching to provide an unregulated power output during stand-by load operations. Related methods and radiotelephones are also discussed.

43 Claims, 2 Drawing Sheets

DUAL MODE POWER CONTROLLERS AND RELATED METHOD AND RADIOTELEPHONES

FIELD OF THE INVENTION

The present invention relates to the field of power regulators and more particularly switching regulators and methods.

BACKGROUND OF THE INVENTION

Buck mode switching regulators can be used to reduce a total current consumed when a load circuit is operated at a voltage less than that of the power source. Buck mode switching regulators are discussed, for example, at pages 6–21 through 6–23 of the ARRL Handbook published by The American Radio Relay League as well as in the data sheet published by Vishay Siliconix entitled "SMP Controller For High Performance Processor Power Supplies", Santa Clara, Calif., pages 1–16, Jan. 25, 1999. Both of these references are hereby incorporated herein by reference.

In particular, a buck mode switching regulator can be used in a radiotelephone to regulate power provided from a battery to a transceiver. The buck mode switching regulator can thus reduce a current consumed when the transceiver is actively transmitting and receiving radiotelephone communications thereby decreasing battery drain. During stand-by operations when the transceiver is not actively transmitting and/or receiving radiotelephone communications, however, the buck mode switching regulator may continue to draw current to control the switching. Accordingly, the buck mode switching regulator may undesirably increase current consumption during stand-by operations. Accordingly, there continues to exist a need in the art for switching regulators that can reduce current consumption during stand-by operations.

It is another object of the present invention to provide power controllers, methods, and radiotelephones that can reduce current consumption and battery drain.

These and other objects can be provided according to the present invention by a power controller including a switch and a switching controller. In particular, the switch is coupled between a power source input and a load output wherein the switch is switched on and off responsive to an input signal. The switching controller is coupled to the switch wherein the switching controller generates the input signal so that the switch is switched on and off to provide a regulated power output to the load output during active load operations and so that the switch is maintained closed to couple the power source to the load output without switching to provide an unregulated power output during stand-by load operations. The power controller of the present invention can thus be used in a radiotelephone to provide the regulated power output to a transceiver during active transceiver operations, and to provide the unregulated power output to the transceiver during stand-by transceiver operations. Accordingly, current consumed by the switching controller during stand-by operations can be reduced without significantly increasing the current consumed by the transceiver.

More particularly, the power controller can include a disable switch coupled between the power supply input and the switching controller. This disable switch can be maintained closed during active load operations so that power is provided to the switching controller, and the disable switch can be maintained open during stand-by load operations so that power is not provided to the switching controller during stand-by operations. Accordingly, current consumed by the switching controller is reduced during stand-by operations. Moreover, the switch can be a p-channel MOSFET, and the input signal generated by the switching controller can go to a low logic level when the disable switch is maintained open during stand-by operations thereby closing the switch to provide the unregulated power output during stand-by operations.

In addition, the switch can include an active switch and a bypass switch coupled in parallel between the power supply input and the load output wherein the active switch is switched on and off to provide the regulated power output to the load output during active load operations while the bypass switch is maintained open. The bypass switch is maintained closed during stand-by operations to couple the power source to the load output without switching to provide the unregulated power output during stand-by operations.

The power controllers, radiotelephones, and methods of the present invention can thus provide reduced current consumption during both active and stand-by operations. Accordingly, power consumption and battery drain can be reduced.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
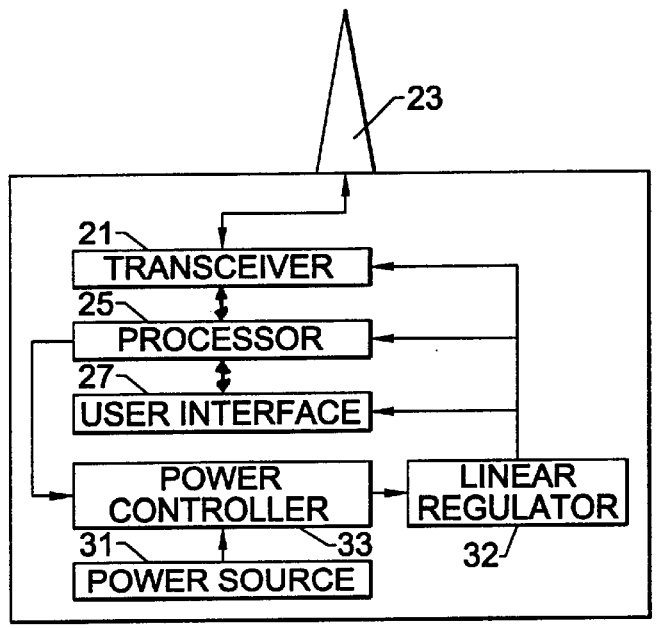
FIG. 1 is a block diagram of a radiotelephone including a switching power regulator according to the present invention.

A cellular radiotelephone including a power controller according to the present invention is illustrated in FIG. 1. As shown, the cellular radiotelephone includes a transceiver 21 for transmitting and receiving cellular radiotelephone communications through antenna 23, and a processor 25 for processing the communications transmitted and received by the transceiver 21. In addition, a user interface 27 is coupled with the processor, and the user interface can include a keypad, a display, a microphone, and a speaker. Accordingly, the radiotelephone can accept user speech through the microphone for transmission to a radiotelephone communications system, and reproduce speech received from a distant party over the radiotelephone communications system using the speaker. Radiotelephone information can be provided to the user through the display, and user input can be accepted through the keypad. Operations of the transceiver 21, processor 25, and user interface 27 will be understood by those having skill in the art and will thus not be discussed further herein.

Power to operate the transceiver 21, the processor 25, and the user interface 27 can be provided by the power source 31 through the power controller 33. Accordingly, a regulated voltage lower than that provided by the battery can be provided during active transceiver operations thereby reducing current consumption and resulting battery drain. During stand-by operations, the power source can be coupled through the power controller to provide the full unregulated battery voltage.

Moreover, a linear regulator 32 can be provided between the power controller 33 and each of the transceiver 21, the processor 25, and the user interface 27. The linear regulator can be a single linear regulator providing power to each of the transceiver 21, the processor 25, and the user interface 27. Alternately, the linear regulator 32 can include a plurality of linear regulators with each of the plurality of linear regulators providing power to one or more of the transceiver, the processor, and the user interface. For example, a separate linear regulator can be provided for each of the transceiver, the processor, and the user interface.

A regulated voltage can thus be provided during stand-by operations when the full unregulated battery voltage is provided by the power controller 33. Furthermore, each of the transceiver, the processor, and/or the user interface can be defined to include a linear regulator.

Figure 2:
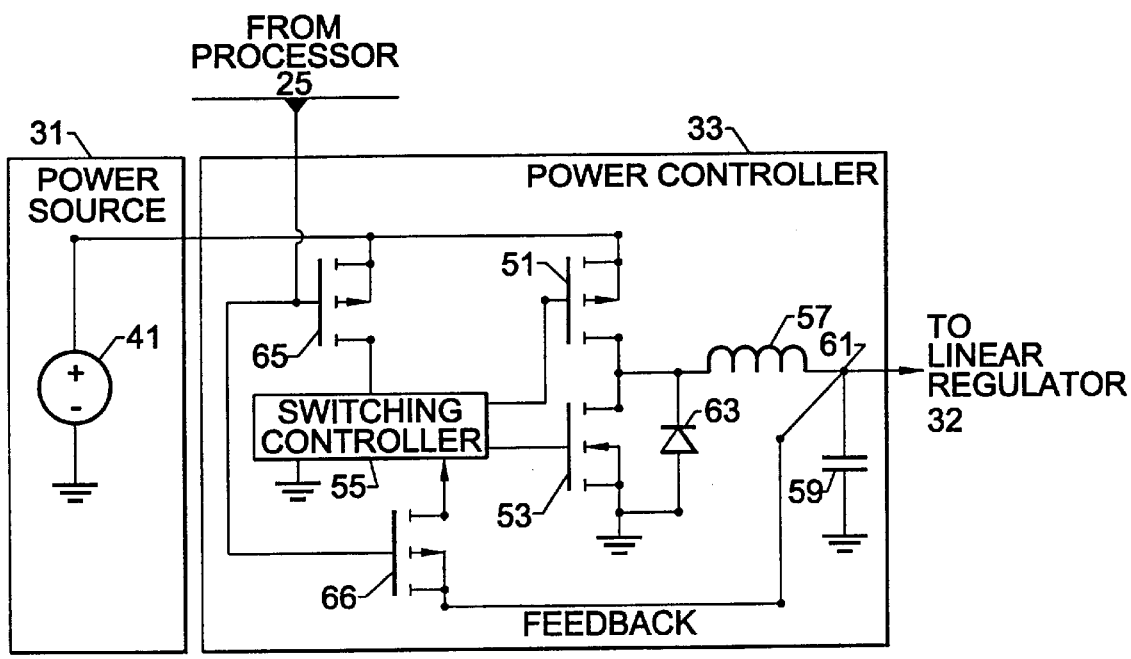
FIG. 2 is a schematic diagram illustrating a first power controller according to FIG. 1.

A schematic diagram of a first power controller according to the present invention is illustrated in FIG. 2. As shown, the power source 31 may include a battery 41, and the power controller 33 may include a switch 51 (such as a p-channel MOSFET) coupled between the battery 41 and the load, and a switch 53 (such as an n-channel MOSFET) coupled between the load and a reference voltage such as the system ground. The switches 51 and 53 operate under the control of the switching controller 55 to switch current to the load through the inductor 57 during active transceiver operations when the transceiver is transmitting and/or receiving radiotelephone communications. The switched power can be filtered using the capacitor 59.

More particularly, the switching controller 55 can be a conventional switching controller such as the Si9140 controller produced by Vishay Siliconix. Operations of the Si9140 controller are discussed in the data sheet entitled "SMP Controller For High Performance Processor Power Supplies" published by Vishay Siliconix, Santa Clara, Calif., pages 1–16, Rev. F, Jan. 25, 1999. The disclosure of this datasheet is hereby incorporated herein in its entirety by reference. In addition, the power source 31 can be a coupling for a radiotelephone battery, or a coupling for an external power source such as an automobile battery.

During active transceiver operations, the switches 51 and 53 are switched on and off in a complementary fashion so that neither switch is on at the same time. When the switch 51 is on and the switch 53 is off, current from the battery 41 flows through the switch 51 through the inductor 57 to the output node 61. When the switch 51 is off and the switch 53 is on, the current is drawn from the reference voltage (such as ground) through the switch 53 and the inductor 57 to the output node 61. The optional freewheeling diode 63 can be included to provide current from the reference voltage any time both switches 51 and 53 are off. Based on feedback from the output node 61, the switching controller 55 can use pulse width modulation techniques such as ripple modulation or duty-cycle modulation to maintain a desired voltage at the output node 61. Modulation techniques are discussed, for example, in the ARRL Handbook at pages 6–21 through 6–23 published by The American Radio Relay League, the disclosure of which is hereby incorporated herein in its entirety by reference.

During stand-by transceiver operations when the radiotelephone is not transmitting and/or receiving, a disable switch 65 (such as a p-channel MOSFET) can be turned off responsive to a control signal generated by the processor 25 thereby cutting off power to the switching controller 55. When power to the switching controller 55 is cut off, the outputs to the switches 51 and 53 both fall to approximately the reference (ground) voltage. Accordingly, the p-channel MOSFET switch 51 is closed, and the n-channel MOSFET switch 53 is opened so that the battery 41 is coupled through the switch 51 and the inductor 57 to the output node 61 without switching. The full unregulated battery voltage (minus any voltage drops) is applied to the output node 61. Current consumption can thus be reduced during stand-by operations because current consumed by the switching controller can be reduced without significantly increasing current consumed by the transceiver 21, the processor 25, or the user interface 27.

A feedback switch 66 can also be included to open the feedback loop from the output node 61 when the power to the switching controller is cut off during stand-by operations. Current drain from the output node 61 through the switching controller can thus be reduced during stand-by operations. This operation can also protect the switching controller during stand-by operations. As shown in FIG. 2, the feedback switch 66 can be a p-channel MOSFET coupled to the control signal generated by the processor 25.

To his knowledge, the inventor is the first to realize that by switching the power off to the switching controller using the disable switch 65, the switch 51 is closed with the resulting low voltage output generated by the unpowered switching controller. Moreover, this advantage can be obtained using a conventional switching controller such as the Si9140 manufactured by Vishay Siliconix with the addition of the disable switch 65.

Figure 3:
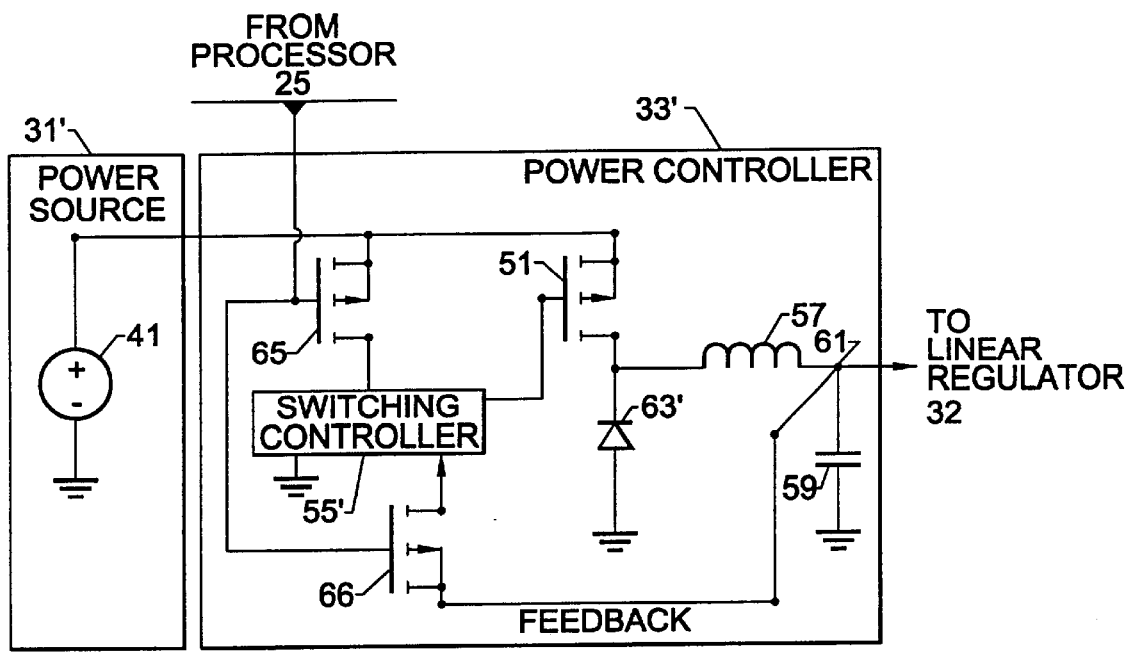
FIG. 3 is a schematic diagram illustrating a second power controller according to FIG. 1.

A second power controller 33' according to the present invention is illustrated in FIG. 3. The operations of the power controller 33' are the same as those discussed above with reference to FIG. 2 with the exception that the n-channel MOSFET switch 53 is eliminated. The use of the freewheeling diode 63' may reduce the complexity of the switching controller 55' in that a control signal from the switching controller 55' is only needed for the switch 51. The losses of the power controller 33', however, may be increased as a result of the forward voltage drop across the freewheeling diode 63'. During active transceiver operations, the switch 51 is turned on and off to switch power from the battery 41 to the output node 61 during active transceiver operations. During stand-by transceiver operations, the disable switch 65 is opened thereby switching off power to the switching controller so that the switching controller outputs go to the reference (ground) voltage level. Accordingly, the p-channel MOSFET switch 51 couples the battery 41 to the output node 61 without switching during stand-by transceiver operations.

Figure 4:
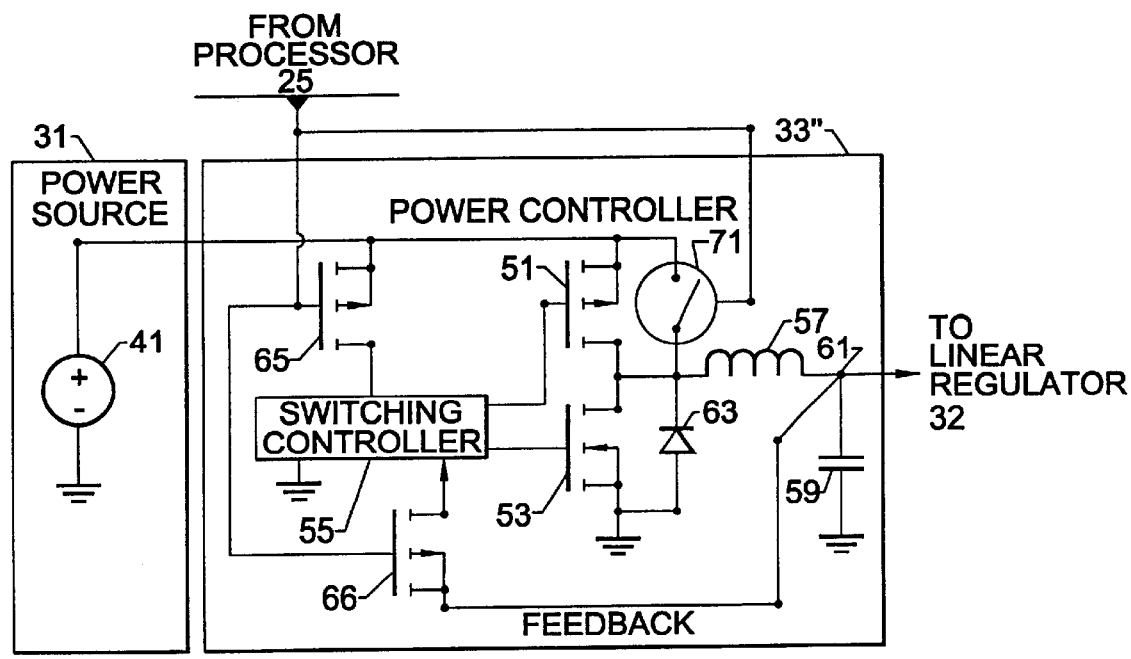
FIG. 4 is a schematic diagram illustrating a third power controller according to FIG. 1.

A third power controller 33" according to the present invention is illustrated in FIG. 4. The operation of this power controller 33" is similar to the operation of the power controller 33 of FIG. 2 with the addition of the bypass switch 71 in parallel with the switch 51. During active transceiver operations, power from the battery 41 is switched through the switch 51 under the control of the switching controller 55 while the bypass switch 71 is maintained open responsive to a control signal from the processor 25. During stand-by transceiver operations, the disable switch 65 is opened thereby cutting off power to the switching controller 55 to reduce current consumed thereby, and the bypass switch 71 is closed to couple the battery to the output node 61 to bypass the switch 51. As before, either the n-channel MOSFET switch 53 or the diode 63 can be omitted.

As discussed above, current consumption during stand-by transceiver operations can be reduced by opening a disable switch between the switching controller and the battery thereby reducing current consumed by the switching controller during stand-by operations. Preferably, the switching controller outputs go to a low state when the disable switch is opened and the low state of the switching controller outputs causes the power source to be coupled to the output node. Alternately, a separate bypass switch can be provided to couple the power source to the node. Power is thus switched to the transceiver during active transceiver operations so that a regulated voltage lower than that of the battery is provided, and power is coupled to the transceiver without switching during stand-by transceiver operations so that an unregulated battery voltage is provided. Accordingly, current consumption and the resulting battery drain can be reduced during stand-by transceiver operations.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A radiotelephone comprising:
    a transceiver that transmits and receives radiotelephone communications;
    a processor coupled to the transceiver wherein the processor processes communications transmitted and received by the transceiver; and
    a power controller that regulates power from a power source coupled to a power source input to the transceiver, the power controller comprising,
        a switch coupled between the power source input and the transceiver wherein the switch is switched on and off responsive to an input signal, and
        a switching controller coupled to the switch wherein the switching controller generates the input signal so that the switch is switched on and off to provide a regulated power output to the transceiver during active transceiver operations and so that the switch couples the power source to the transceiver without switching to provide an unregulated power output during stand-by transceiver operations.

2. A radiotelephone according to claim 1 wherein the power controller further comprises,
    a disable switch coupled between the power supply input and the switching controller wherein the disable switch is maintained in a first state during active transceiver operations so that power is provided to the switching controller, and wherein the disable switch is maintained in a second state during stand-by transceiver operations so that power is not provided through the disable switch to the switching controller during stand-by operations.

3. A radiotelephone according to claim 2 wherein the disable switch comprises a p-channel MOSFET.

4. A radiotelephone according to claim 2 wherein the switch comprises a p-channel MOSFET and wherein the input signal goes to a low logic level when the disable switch is maintained in the second state during stand-by transceiver operations thereby coupling the power source to the transceiver through the switch to provide the unregulated power output during stand-by operations.

5. A radiotelephone according to claim 1 wherein the switch comprises a p-channel MOSFET.

6. A radiotelephone according to claim 5 wherein the switching controller is powered off during stand-by transceiver operations so that the input signal goes to a low logic low level when the switching circuit is powered off thereby coupling the power source to the transceiver through the switch to provide the unregulated power output during stand-by transceiver operations.

7. A radiotelephone according to claim 1 wherein the power source comprises a battery.

8. A radiotelephone according to claim 1 further comprising:
    an inductor coupled between the switch and the transceiver; and
    a capacitor coupled between the transceiver and a reference voltage.

9. A radiotelephone according to claim 1 wherein the switch comprises active and bypass switches coupled in parallel between the power supply input and the transceiver wherein the active switch is switched on and off to provide the regulated power output to the load output during active transceiver operations while the bypass switch is maintained off, and wherein the bypass switch couples the power source to the transceiver without switching to provide the unregulated power output during stand-by transceiver operations.

10. A radiotelephone according to claim 1 wherein the switch comprises a single switch.

11. A method for regulating power from a power source to a transceiver, the method comprising the steps of:
    switching the power on and off to provide a regulated power output to the transceiver during active transceiver operations; and
    coupling the power source to the transceiver without switching to provide an unregulated power output during stand-by transceiver operations.

12. A method according to claim 11 wherein the power source comprises a battery.

13. A method according to claim 11 wherein switching the power on and off to provide the regulated power output to the transceiver during active transceiver operations comprises switching the power from the power source on and off.

14. A radiotelephone comprising:
    means for transmitting and receiving radiotelephone communications;
    means for processing communications transmitted and received by the means for transmitting and receiving; and
    means for regulating power from a power source to the means for transmitting, the means for regulating comprising,
        means for switching the power on and off to provide a regulated power output to the means for transmitting and receiving during active transmitting and receiving operations, and
        means for coupling the power source to the means for transmitting and receiving without switching to provide an unregulated power output during stand-by operations.

15. A radiotelephone according to claim 14 wherein the means for regulating further comprises,
    a switch coupled between the power source and the means for transmitting and receiving wherein the means for switching the power on and off to provide the regulated power output during active transmitting and receiving operations comprises means for switching the switch on and off to provide the regulated power output to the means for transmitting and receiving during active transmitting and receiving operations and wherein the means for coupling comprises means for coupling the power source to the means for transmitting and receiving through the switch without switching to provide the unregulated power output during stand-by operations.

16. A radiotelephone according to claim 15 wherein the switch comprises a p-channel MOSFET.

17. A radiotelephone according to claim 14 wherein the power source comprises a battery.

18. A radiotelephone according to claim 14 wherein the means for regulating power further comprises, an inductor coupled between the means for switching and the means for transmitting and receiving; and a capacitor coupled between the means for transmitting and receiving and a reference voltage.

19. A radiotelephone according to claim 14 wherein the means for switching comprises an active switch coupled between the power supply and the means for transmitting and receiving wherein the active switch is switched on and off to provide the regulated power output to the means for transmitting and receiving during active transmitting and receiving operations, and wherein the means for coupling comprises a bypass switch coupled between the power supply input and the means for transmitting and receiving in parallel with the active switch wherein the bypass switch is maintained off during active transmitting and receiving operations and wherein the bypass switch couples the power source to the means for transmitting and receiving without switching to provide the unregulated power output during stand-by operations.

20. A radiotelephone according to claim 14 wherein the means for switching the power on and off to provide the regulated power output to the means for transmitting and receiving during active transmitting and receiving operations comprises means for switching the power from the power source on and off.

21. A power controller for regulating power from a power source coupled to a power source input to a load coupled to a load output, the power controller comprising:

a switch coupled between the power source input and the load output wherein the switch is switched on and off responsive to an input signal; and a switching controller coupled to the switch wherein the switching controller generates the input signal so that the switch is switched on and off to provide a regulated power output to the load output during active load operations and so that the switch couples the power source to the load output without switching to provide an unregulated power output during standby load operations.

22. A power controller according to claim 21 further comprising a disable switch coupled between the power supply input and the switching controller wherein the disable switch is maintained in a first state during active load operations so that power is provided to the switching controller, and wherein the disable switch is maintained in a second state during stand-by load operations so that power is not provided through the disable switch to the switching controller during stand-by operations.

23. A power-controller according to claim 22 where the disable switch comprises a p-channel MOSFET.

24. A power controller according to claim 22 wherein the switch comprises a p-channel MOSFET and wherein the input signal goes to a low logic level when the disable switch is maintained in the second state during stand-by load operations thereby coupling the power source to the transceiver through the switch to provide the unregulated power output during stand-by operations.

25. A power controller according to claim 21 wherein the switch comprises a p-channel MOSFET.

26. A power controller according to claim 25 wherein the switching controller is powered off during stand-by load operations so that the input signal goes to a low logic low level when the switching circuit is powered off thereby coupling the power source to the transceiver through the switch to provide the unregulated power output during stand-by load operations.

27. A power controller according to claim 21 wherein the load comprises one of a transmitter, and a receiver.

28. A power controller according to claim 21 wherein the power source comprises a battery.

29. A power controller according to claim 21 further comprising:

an inductor coupled between the switch and the load output; and a capacitor coupled between the load output and a reference voltage.

30. A power controller according to claim 21 wherein the switch comprises active and bypass switches coupled in parallel between the power supply input and the load output wherein the active switch is switched on and off to provide the regulated power output to the load output during active load operations while the bypass switch is maintained off, and wherein the bypass switch couples the power source to the load output without switching to provide the unregulated power output during stand-by operations.

31. A power controller according to claim 21 wherein the switch comprises a single switch.

32. A method for regulating power from a power source to a load, the method comprising the steps of:

switching the power on and off to provide a regulated power output to the load during active load operations; and coupling the power source to the load output without switching to provide an unregulated power output during stand-by load operations.

33. A method according to claim 32 wherein the load comprises one of a transmitter, and a receiver.

34. A method according to claim 32 wherein the power source comprises a battery.

35. A method according to claim 32 wherein switching the power on and off to provide the regulated power output to the load during active load operations comprises switching the power from the power source on and off.

36. A power controller for regulating power from a power source coupled to a power source input to a load coupled to a load output, the power controller comprising:

means for switching the power on and off to provide a regulated power output at the load output during active load operations; and means for coupling the power source to the load output without switching to provide an unregulated power output during stand-by load operations.

37. A power controller according to claim 36 further comprising:

a switch coupled between the power source input and the load output wherein the means for switching the power on and off to provide the regulated power output during active load operations comprises means for switching the switch on and off to provide the regulated power output to the load output during active load operations and wherein the means for coupling comprises means coupling the power source to the load output through the switch without switching to provide the unregulated power output during stand-by load operations.

38. A power controller according to claim 37 wherein the switch comprises a p-channel MOSFET.

39. A power controller according to claim 36 wherein the load comprises one of a transmitter, and a receiver.

40. A power controller according to claim 36 wherein the power source comprises a battery.

41. A power controller according to claim 36 further comprising:

an inductor coupled between the means for switching and the load output; and a capacitor coupled between the load output and a reference voltage.

42. A power controller according to claim 36 wherein the means for switching comprises an active switch coupled between the power supply input and the load output wherein the active switch is switched on and off to provide the regulated power output to the load output during active load operations, and wherein the means for coupling comprises a bypass switch coupled between the power supply input and the load output in parallel with the active switch wherein the bypass switch is maintained off during active load operations and wherein the bypass switch couples the power source to the load output without switching to provide the unregulated power output during stand-by operations.

43. A power controller according to claim 36 wherein the means for switching the power on an off to provide the regulated power output at the load output during active load operations comprises means for switching the power from the power source on and off.

* * * * *